(12) United States Patent
Walworth

(10) Patent No.: US 7,278,507 B2
(45) Date of Patent: Oct. 9, 2007

(54) COLLAPSIBLE PERSONAL TRANSPORTATION VEHICLE

(76) Inventor: Bruce Walworth, 7640 Werkner Rd., Chelsea, MI (US) 48118

( * ) Notice: Subject to any disclaimer, the term of this patent is extended or adjusted under 35 U.S.C. 154(b) by 353 days.

(21) Appl. No.: 10/831,437

(22) Filed: Apr. 23, 2004

(65) Prior Publication Data

US 2005/0236202 A1  Oct. 27, 2005

(51) Int. Cl.
*B62K 15/00* (2006.01)

(52) U.S. Cl. ............... 180/208; 280/278; 280/287; 280/639

(58) Field of Classification Search .......... 180/208; 280/287, 639, 647, 650, 657, 87.05, 278
See application file for complete search history.

(56) References Cited

U.S. PATENT DOCUMENTS

| | | | | |
|---|---|---|---|---|
| 3,329,228 | A | | 7/1967 | Harris |
| 3,369,629 | A | * | 2/1968 | Weiss ............... 180/208 |
| 3,572,757 | A | * | 3/1971 | Camps .............. 180/208 |
| 3,580,348 | A | * | 5/1971 | Di Blasi ............ 180/208 |
| 3,589,745 | A | * | 6/1971 | Dougherty et al. ...... 280/639 |
| 3,850,472 | A | | 11/1974 | Greppi ............... 296/27 |
| 4,089,542 | A | | 5/1978 | Westerman ........... 280/639 |
| 4,340,124 | A | | 7/1982 | Leonard ............. 180/208 |
| 4,830,133 | A | * | 5/1989 | Gaddi .............. 180/208 |
| 4,944,360 | A | | 7/1990 | Sturges ............. 180/210 |
| 5,228,533 | A | | 7/1993 | Mitchell ............ 180/208 |
| 5,277,267 | A | * | 1/1994 | Tiffany ............. 180/208 |
| 5,312,126 | A | | 5/1994 | Shortt et al. ........ 280/287 |
| 5,417,300 | A | | 5/1995 | Shultz .............. 280/208 |
| 5,695,021 | A | | 12/1997 | Schaffner et al. ...... 280/208 |
| 6,050,593 | A | | 4/2000 | McConnell et al. ..... 280/657 |
| 6,176,337 | B1 | | 1/2001 | McConnell et al. ..... 180/208 |
| 6,371,235 | B1 | | 4/2002 | Wisecarver .......... 180/208 |
| 6,851,498 | B1 | * | 2/2005 | Sauve ............... 180/208 |
| 6,866,109 | B2 | * | 3/2005 | Roach .............. 180/65.1 |
| 2005/0077097 | A1 | * | 4/2005 | Kosco et al. ........ 180/208 |
| 2005/0173175 | A1 | * | 8/2005 | Lee ................. 180/208 |

FOREIGN PATENT DOCUMENTS

DE  3206854 A1 * 9/1983

* cited by examiner

*Primary Examiner*—Eric Culbreth
*Assistant Examiner*—Laura B. Freedman
(74) *Attorney, Agent, or Firm*—Gifford, Krass, Sprinkle, Anderson & Citkowski

(57) ABSTRACT

A collapsible personal transportation vehicle may be compacted and stowed in a mobile home, recreational vehicle, or the like, during periods of non-use and transport. Although the vehicle may be powered with a gasoline or electric power plant, a propane fueled engine is used due to its lighter weight and lack of fumes or leakage problems during transport. The vehicle may accommodate two riders, and achieve speeds of up to 30 miles per hour, or greater. To achieve sufficient collapsibility, the vehicle includes a seat assembly constructed from various pivoting members, whereby, during use, riders are seated above the motor, but during periods of non-use, the seat assembly folds down to fit into a space in front of the engine, with a height no greater than the engine and fuel tank(s). The preferred embodiment accommodates a roof structure as part of the collapsible seat assembly, which may be provided with a canopy and/or rear-view mirror, if so desired.

12 Claims, 4 Drawing Sheets

COLLAPSIBLE PERSONAL TRANSPORTATION VEHICLE

FIELD OF THE INVENTION

This invention relates generally to motor vehicles and, in particular, to a collapsible personal transportation vehicle that may be stowed in a storage bay of a motor home, sport utility vehicle, and the like, when not in use.

BACKGROUND OF THE INVENTION

The desire for convenient personal transportation has lead to many different types of smaller-scale vehicles, including models that fold or collapse. U.S. Pat. No. 3,329,228, for example, relates to motor propelled carts, and particularly to a motor driven cart which is foldable into a small package for storage and transportation. U.S. Pat. No. 3,850,472 resides in a small car formed of two parts hinged at the top and adapted to partially fit one into the other, so as to reduce the bulk of the car when the latter is parked, sheltered or transported.

A foldable vehicle adapted to be transported in its own container on the back of a motor home, yacht, or the like, for storage or shipping is described in U.S. Pat. No. 4,089,542. The vehicle is motorized and has a chassis and a plurality of wheels along with passenger seats. The vehicle has means for raising and lowering the wheels relative to the chassis between an operative position and a collapsed position. In addition, the hood, window frame, steering wheel column, steering wheel, seats, and roll bar fold to provide a compact, folded vehicle for a shipping or storage container.

A minicar is disclosed in U.S. Pat. No. 4,340,124 which can be folded into a smaller size, when not in use. The minicar is comprised of two main frames which are connected by a parallelogram linkage system. The minicar is unfolded and folded by swinging one of the frames in an arc with respect to the other frame. A separate linkage system is attached to the parallelogram linkage system to fold and unfold the rear wheels of the minicar. The rear wheels swing in an arc when the minicar is being folded or unfolded. The minicar has two stable states, the folded state and the unfolded state. In the unfolded state, one frame member is above and offset from the other frame member and the wheels are in the operating position. When the minicar is in the folded state, one frame is almost directly above the other frame and all the wheels are almost completely under the top frame. The minicar also comprises a foldable enclosure which folds into layers when the minicar is not being used.

A three-wheel vehicle, described U.S. Pat. No. 4,944,360, has two forward wheels that are driven and steerable. The two forward wheels and the single rear wheel are supported on a single-unit platform member that is molded from an engineering plastic. The vehicle rear wheel is mounted on a trailing arm that is pivoted at generally the middle underside of the platform member. This trailing arm is movable to facilitate three-point vehicle storage, as the vehicle rests on its two front wheels and on its then closely adjacent rear wheel, with the trailing arm in a vertical position. The platform member includes a plurality of pipe-like attachment clip/handles strategically located both within the bounds of the platform and about the periphery of the platform. The vehicle is intended for use by a seated or a standing individual. A plurality of accessories facilitate use of the vehicle by both a seated and by a standing individual, and protect the individual from the environment. Attachments that facilitate cargo carrying and protection of the individual are also described.

In U.S. Pat. No. 5,228,533 a scooter is described that may be easily assembled and assembled without requiring lifting any heavy parts. The scooter may be easily broken down into a main frame, a drive portion, a motor portion and a power transmission portion.

A light, portable golf riding apparatus of U.S. Pat. No. 5,312,126 may be electric motor or pedal driven. The lower weight of the apparatus is provided in part by using a tubular construction, with few, if any, panels, and portability is provided by having the apparatus formed from several sections or frameworks pivoting in relation to each other. In one embodiment, a first central section holds the power train and rear wheels, a front section holds the steering column, and a third a seat for the rider. The central and front sections pivot towards each other, the seat folds onto the central section and the steering collapses about the apparatus to form a compact body.

U.S. Pat. No. 5,417,300 is directed to a nesting passenger vehicle designed to improve access to subways and commuter trains by virtue of its reduced parking area requirements. A short cabin and a V-shaped frame permit the vehicle to nest or horizontally stack into other vehicles of the same shape in a manner that requires a small amount of parking space per vehicle. The present invention provides a significant parking density advantage compared to conventional, privately owned automobiles.

An electrically-powered scooter vehicle described in U.S. Pat. No. 5,695,021 for use by elderly, disabled and infirm people includes a self-locking connection means for connecting front and rear frame portions of the scooter. The scooter is convertible between three-wheel and four-wheel versions without use of tools. Automatic shut-off circuitry minimizes inadvertent loss of battery power due to failure to turn off the scooter. An adjustably lockable telescoping tiller facilitates use of the scooter by persons of all sizes.

U.S. Pat. Nos. 6,050,593 and 6,176,337 relate to a personal mobility vehicle having front and rear chassis members interconnected by a locking means. The rear chassis member includes alignment means for aligning the rear chassis with a suspension assembly of the front chassis. An adjustable seat assembly supports a user while preventing accidental disengagement of the locking means.

A collapsible vehicle having a frame, a non-steerable wheel assembly and a steerable wheel assembly is disclosed in U.S. Pat. No. 6,371,235. The frame includes a longitudinal member, a transverse member, an upright member proximal to one end of the longitudinal member, and a steering member proximal to another end of the longitudinal member. The longitudinal member and the transverse member define a base plane. The non-steerable wheel assembly includes a non-steerable-wheel movable between a storage position within the periphery of the frame to a deployed position outside the periphery of the frame and extending below the base plane. The steerable wheel assembly includes a steerable wheel movable between a storage position within the periphery of the frame to a deployed position outside the periphery of the frame and extending below the base plane. A method of using the collapsible vehicle is also disclosed.

Despite these and other advances, the need still remains for a personal transportation vehicle that may be collapsed to fit into smaller spaces, including motor-home cargo bays, pick-up trucks, and other off-road and sport-utility vehicles.

SUMMARY OF THE INVENTION

This invention resides in a collapsible personal transportation vehicle that may be compacted and stowed in a motor home, recreational vehicle, or the like, during periods of non-use and transport. The vehicle is therefore ideally suited to individuals who are unwilling or unable to endure long walks, in both urban and rural environments. Although the vehicle may be powered with a gasoline or electric power plant, a propane fueled engine is used due to its lighter weight and lack of fumes or leakage problems during transport. The vehicle may accommodate two riders, and achieve speeds of up to 30 miles per hour, or greater.

To achieve sufficient collapsibility, the vehicle includes a seat assembly constructed from various pivoting members, whereby, during use, riders are seated above the motor, but during periods of non-use, the seat assembly folds down to fit into a space in front of the engine, with a height no greater than the engine and fuel tank(s). The preferred embodiment accommodates a roof structure as part of the collapsible seat assembly, which may be provided with a canopy and/or rear-view mirror, if so desired.

DETAILED DESCRIPTION OF THE INVENTION

Figure 1:
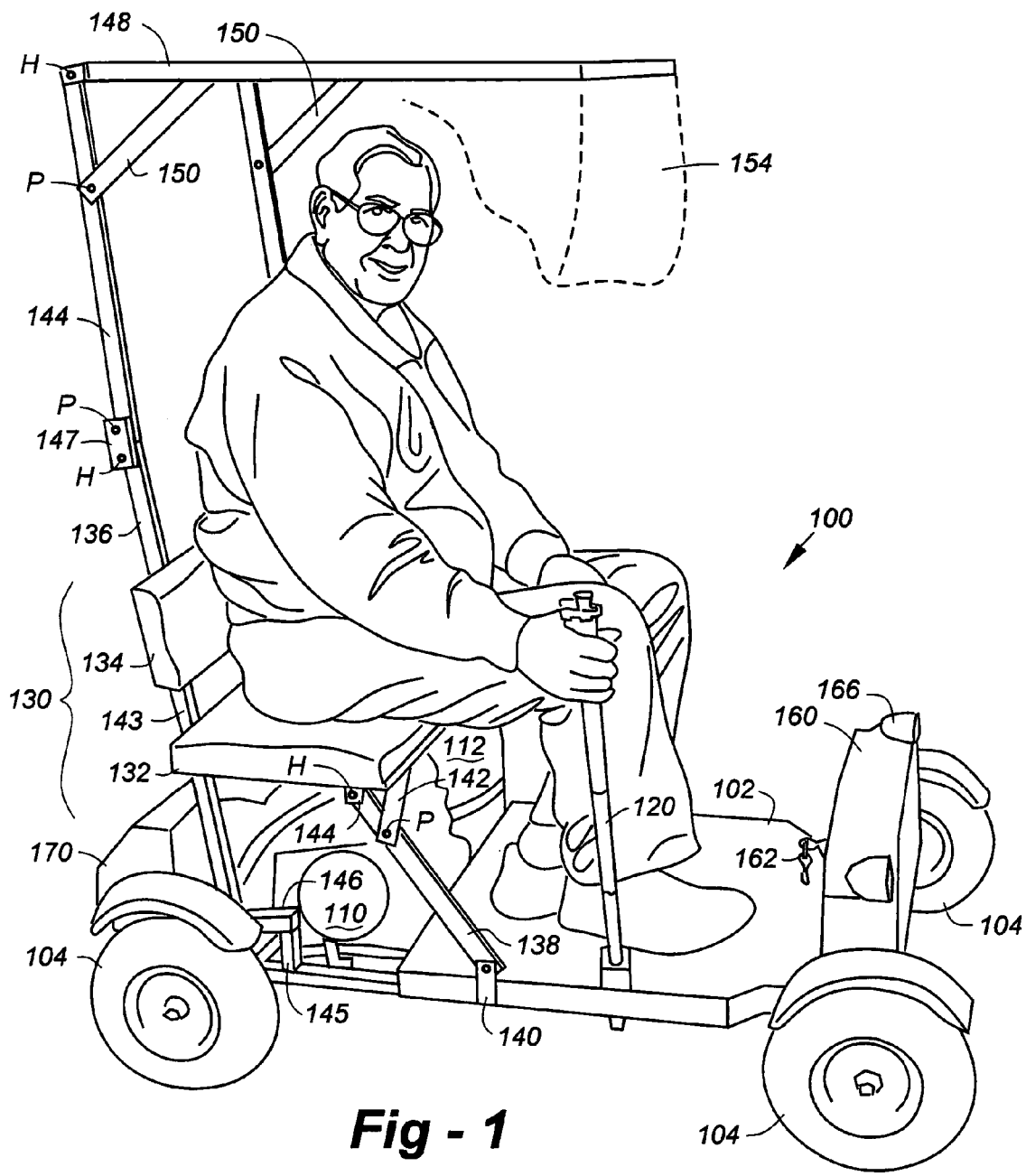
FIG. 1 is a drawing from an oblique perspective showing the preferred embodiment of the invention including an operator of the vehicle.

Referring now to the drawings, FIG. 1 depicts generally at 100 a vehicle constructed in accordance with the preferred embodiment of this invention, including a single rider, although the seating arrangement will accomodate two occupants side-by-side. The vehicle comprises a frame 102 upon which there is rotatably mounted a set of wheels 104 driven by a power plant 110. Although the vehicle may utilize a gasoline engine or electric motor, due to the weight of an electric engine and the fumes or leaks that might be associated with a gasoline engine, a propane engine is preferably used, incorporating one or more tanks 112.

Upon the frame there is foldably mounted a seat assembly 130, including a cushion 132 and an optional back rest 134, all mounted on structural members which will be described in further detail below. In terms of materials, the various frame and structural members may utilize any appropriate material, preferably tubular steel, though aluminum, plastic and even wood may be utilized where appropriate for considerations of weight, decoration, and so forth. Hinges are shown at "H," whereas pins are depicted at "P."

Optionally, to make the vehicle more like a larger-sized car, a front grill assembly 160 is provided, including headlights 166. A key switch 162 is also conveniently mounted on this front grill assembly. A rear assembly 170 is also optionally provided, onto which there may be mounted tail lights, brake lights, reflectors, and the like.

The collapsible seat assembly 130 includes a pair of forward seat support members 138, the lower end of each being pivoted to the frame through frame pivots 140, and pivoted to the seat through seat pivots 144. The seat cushion 132 rests on a frame including horizontal seat supports 143, each of which is hinged at one end to a backrest support 136 and a seat link member 142 pivotally connected to each forward seat support 138.

Note that, according to the invention, the various elements above the seat cushion 132 are, in fact, optional, including the back rest 134 and associated support members. Additionally optional is a roof structure, consisting of a pair of opposing roof supports 144, a roof frame 148, and roof brace members 150, one each on either side of the roof structure. Though not shown, the vehicle may be provided with a canopy 154 to keep the occupants protected from the elements.

Figure 2:
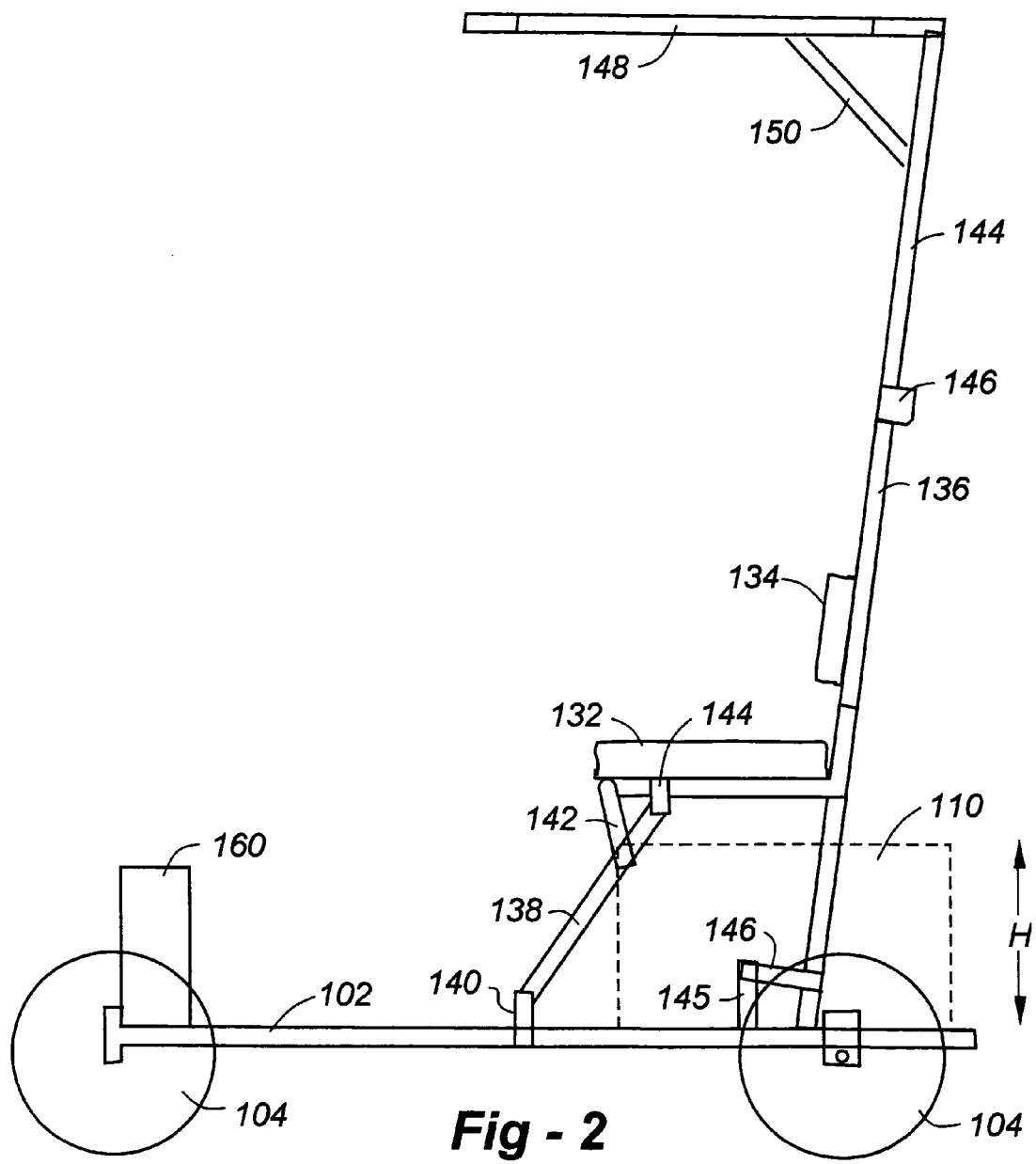
FIG. 2 is a schematic, side-view rendering of the preferred embodiment, showing the positioning in a relationship of various structural members when the vehicle is in use for riding.

FIG. 2 is a schematic, side-view drawing of a vehicle according to the preferred embodiment, showing the various structural elements in position for riding the vehicle. This drawing, and subsequent figures, perhaps better illustrate the way in which the seat assembly folds down into the front section of the vehicle in front of the power plant 110, resulting in an overall height up from the frame "H" which is sufficiently low in profile to allow the vehicle in a collapsed state (FIG. 4) to be loaded into a mobile home (FIG. 6) or a sport-utility vehicle (SUV, FIG. 7) or other transport situation. Also to maximize ground clearance a high-mounted differential and dive shaft(s) are used.

Figure 4:
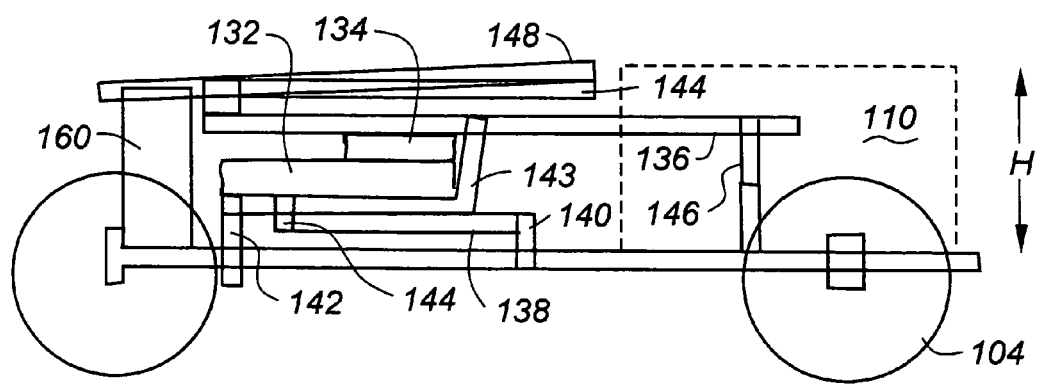
FIG. 4 is a schematic side-view drawing showing the vehicle in a fully collapsed state, wherein the seat assembly is tucked into a forward portion of the frame, assuming a height no greater than the power plant.

FIG. 2 shows how the horizontal seat support 143 is actually L-shaped, and hinged to the forward seat support 138 and back rest support 136 so that the seat cushion 132 remains substantially in a horizontal position as the assembly folds down as shown in FIG. 4 in the fully collapsed state. The lower portions of the back rest supports 136 are hinged to upright members 145 through a member 146 generally transverse to the back rest support 136, such that when the assembly pivots forward, the back rest 134 is positioned on top of the seat cushion 132 with the upper end of the back rest support 136 in the vicinity of hinge 146 being located just back from the front grill assembly 160.

Although the roof frame is optional, supports 144, 148 may be added to form a roof frame, and an optional canopy may be provided thereon. A roof brace 150, with fastening pins may also be provided for additional support.

Figure 3:
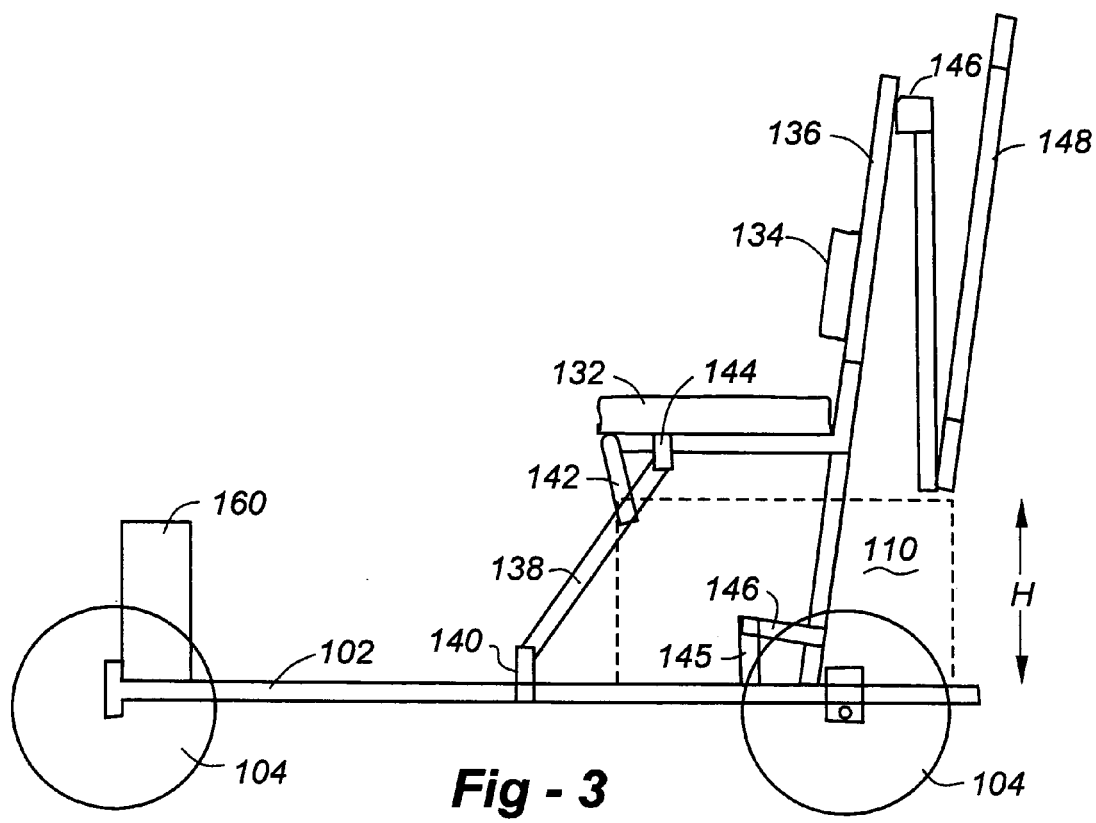
FIG. 3 is a schematic side-view drawing showing the vehicle in a partially collapsed state, wherein the optional roof structure is partially folded.
Figure 5:
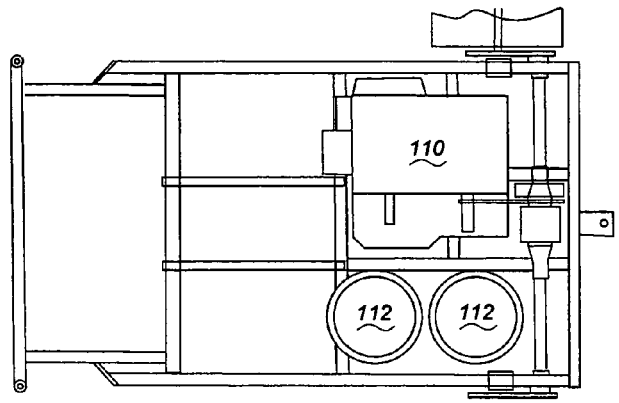
FIG. 5 is a top-down schematic drawing of a vehicle according to the preferred embodiment.
Figure 6:
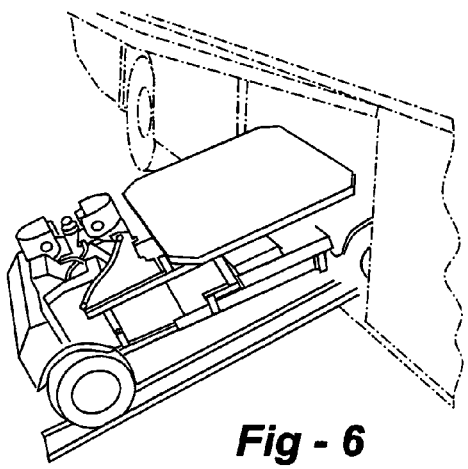
FIG. 6 illustrates how a vehicle according to this invention may be loaded into a standard compartment on the side of a motor home or similar vehicle.
Figure 7:
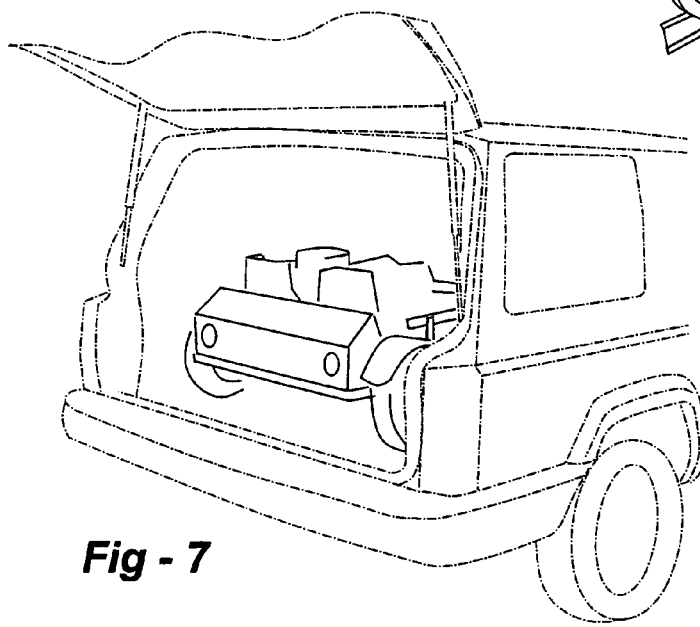
FIG. 7 is a simplified drawing showing how a vehicle constructed in accordance with this invention may be loaded into the back of a recreational vehicle or SUV.

As discussed above, FIG. 3 is a schematic, side-view drawing of a vehicle according to the invention including an optional roof assembly folded down in an intermediate condition prior to folding down the seat assembly as shown in FIG. 4. FIG. 5 is a top-down drawing showing the placement of other components, such as the motor, fuel tanks, and other components associated with operational. The preferred embodiment utilizes a continuously variable transmission and a steering stick, with the advantage being that it may be folded down along with the other components for compact stowage. FIG. 6 is a simplified drawing of the vehicle being loaded into the cargo bay of a mobile home, and FIG. 7 is a drawing showing a vehicle according to the invention stored in the back of a sport-utility vehicle.

I claim:

1. A collapsible personal transportation vehicle, comprising:
   a frame with four wheels, a front portion and a rear portion;
   a power plant with a height mounted on the rear portion of the frame; and
   a foldable seat assembly including a collapsible roof structure facilitating:
      a first configuration for driving the vehicle, wherein a seat is positioned above the power plant, and
      a second configuration for stowage, wherein the seat assembly and roof structure are collapsed into the front portion with a height substantially the same or less than the height of the power plant.

2. The collapsible personal transportation vehicle according to claim 1, wherein the seat is wide enough to accommodate two occupants.

3. The collapsible personal transportation vehicle according to claim 1, further including a knock-down steering column.

4. A collapsible personal transportation vehicle, comprising:
   a frame with four wheels, a front portion and a rear portion;
   a power plant with a height mounted on the rear portion of the frame; and
   a foldable seat assembly facilitating:
      a first configuration for driving the vehicle, wherein a seat is positioned above the power plant, and
      a second configuration for stowage, wherein the seat assembly is collapsed into the front portion with a height substantially the same or less than the height of the power plant; and
   wherein the seat assembly includes a pair of forward hinged seat supports and a pair of rearward hinged seat supports, such that the seat remains substantially horizontal as it is folded into the front portion.

5. The collapsible personal transportation vehicle according to claim 4, wherein the seat is wide enough to accommodate two occupants.

6. The collapsible personal transportation vehicle according to claim 4, further including a knock-down steering column.

7. A collapsible personal transportation vehicle, comprising:
   a frame with four wheels, a front portion and a rear portion;
   a power plant with a height mounted on the rear portion of the frame; and
   a foldable seat assembly facilitating:
      a first configuration for driving the vehicle, wherein a seat is positioned above the power plant, and
      a second configuration for stowage, wherein the seat assembly is collapsed into the front portion with a height substantially the same or less than the height of the power plant; and wherein:
   the seat assembly includes a pair of rearward hinged seat supports; and
   a backrest mounted on the rearward hinged seat supports.

8. The collapsible personal transportation vehicle according to claim 7, wherein the seat is wide enough to accommodate two occupants.

9. The collapsible personal transportation vehicle according to claim 7, further including a knock-down steering column.

10. A collapsible personal transportation vehicle, comprising:
    a frame with four wheels, a front portion and a rear portion;
    a power plant with a height mounted on the rear portion of the frame; and
    a foldable seat assembly facilitating:
       a first configuration for driving the vehicle, wherein a seat is positioned above the power plant, and
       a second configuration for stowage, wherein the seat assembly is collapsed into the front portion with a height substantially the same or less than the height of the power plant; and
    wherein the power plant is propane-fired.

11. The collapsible personal transportation vehicle according to claim 10, wherein the seat is wide enough to accommodate two occupants.

12. The collapsible personal transportation vehicle according to claim 10, further including a knock-down steering column.

* * * * *